United States Patent [19]

Warren et al.

[11] 4,204,934
[45] May 27, 1980

[54] PROCESS FOR APPLICATION OF ELECTROSTATIC FIELDS TO MIXING AND SEPARATING FLUIDS

[75] Inventors: Kenneth W. Warren, Jenks; Floyd L. Prestridge, Mounds, both of Okla.

[73] Assignee: Combustion Engineering, Inc., Windsor, Conn.

[21] Appl. No.: 12,997

[22] Filed: Feb. 21, 1979

Related U.S. Application Data

[62] Division of Ser. No. 892,612, Apr. 3, 1978, Pat. No. 4,161,439.

[51] Int. Cl.² .............................................. B03C 5/00
[52] U.S. Cl. .................................... 204/186; 204/188
[58] Field of Search ................................ 204/186–191

[56] References Cited

U.S. PATENT DOCUMENTS

| | | | |
|---|---|---|---|
| 1,838,933 | 12/1931 | Fisher | 204/302 |
| 2,092,491 | 9/1937 | Adams et al. | 204/302 |
| 3,437,575 | 4/1969 | Gross et al. | 204/305 |
| 4,126,537 | 11/1978 | Prestridge | 204/188 |

FOREIGN PATENT DOCUMENTS

| | | | |
|---|---|---|---|
| 695799 | 10/1964 | Canada | 204/186 |
| 1205562 | 9/1970 | United Kingdom | 204/186 |

Primary Examiner—T. M. Tufariello
Attorney, Agent, or Firm—Arthur L. Wade

[57] ABSTRACT

Flow paths for liquids are disclosed in vessels, the paths oriented with electrodes which are electrically energized to establish electrostatic fields through the paths, one of the liquids is more polar than the other liquids in the paths, one of the fields is intense enough to generate the force to move drops of the polar liquid fast enough to shear the drops to smaller sizes and disperse the smaller drops. A second one of the fields is less intense than the first field yet intense enough to generate the force to move the dispersed drops into coalescense. Various spacing and means of energizing the electrodes are disclosed to place the forces on the liquids in sequence and at different intensities.

6 Claims, 5 Drawing Figures

4,204,934

PROCESS FOR APPLICATION OF ELECTROSTATIC FIELDS TO MIXING AND SEPARATING FLUIDS

BACKGROUND OF THE INVENTION

This application is a Division of Application Ser. No. 892,612 filed Apr. 3, 1978 now U.S. Pat. No. 4,161,439.

FIELD

This invention relates to all processes which include the requirement that two, or more liquids are mixed thoroughly and then separated. The liquids are immiscible. The more polar of the liquids is dispersed in another liquid as the continuous phase of the mixture. The invention, then specifically relates to the application of an electrostatic field generated to vary in gradient along the flow path of the mixture to first mix the fluids and then coalsesce the dispersed drops of the more polar fluid.

THE STATE OF THE ART

In the oil field, the dispersion of water droplets in oil is well-known. The dispersion may form a very "tight" emulsion, an emulsion which is very stable, i.e., will not break down with time. Whether the emulsion is formed naturally, and is so produced, or whether it is created by liquid-shearing pumps, the separation is a well developed art.

Several forces have been used to demulsify oil and water. When water is removed from oil, the oil is sometimes referred to as "dehydrated" rather than demulsified. It does not matter, at this level of description—the water is removed from the oil and an entire industry has developed to achieve this result and so reduce the cost of transporting and refining the produced petroleum. Among the forces brought to bear is that of the electrostatic field generated by electrodes energized by a source of electrical energy. In the field, a dispersed, more polar, fluid will have its droplets moved into collision with each other. The collision will cause little droplets to form big drops. Gravity will take over and the large drops will move from their surrounding continuous phase of fluid and separate.

Some of the history of the electrostatic field in the petroleum industry is found in recently issued U.S. Pat. No. 4,039,404. This disclosure is incorporated by reference for the purpose of background. A more fundamental tracing of this use of the electrostatic field is found in U.S. Pat. No. 3,772,180 which is incorporated into this application with the pride of authorship.

The petroleum fluids are not the only fluids with the problem of separation after two of the fluids have been mixed. For years, the mining industry has been developing the technology of leaching metals from ore with acid and transferring the metallic cations to liquids from which the metal can be commercially extracted.

A specific example of this mining technique is the selective recovery of copper from aqueous solutions resulting from leaching copper-bearing minerals. Organic, water-immiscible extracting agents are intimately contacted with the aqueous, copper-bearing solution, resulting in a transfer of the copper values from the aqueous phase to the organic phase. The phases have previously been allowed to separate in large settling tanks, and the copper recovered from the separated organic phase. The output of these processes has been limited by the size of the settling tanks, sufficient residency in the settling tanks being required to obtain satisfactory separation of the organic phase and the aqueous phase.

In a United Kingdom Pat. No. 909,485, processes are disclosed wherein an aqueous phase and an organic phase are first intimately mixed with each other, the dispersion or mixture being subsequently separated into its respective phases in a gravity settling tank. Improved settling rates were obtained by producing a high voltage electric field in the settling tank in the region of the emulsion and separating the aqueous phase from the organic phase.

Describing other industries where fluids must be separated from fluids can be done. However, more examples might form a patchwork in which the basic problem might be obscured. There is a problem of mixing the fluids, for whatever processing purpose will be served. Then there is the separation problem. The mixing problem revolves around bringing the fluids together to transfer material between them but avoiding formation of an emulsion of the fluids which is so tight that separation takes so long that the size of the inventory of fluids gets out of hand. Further, if mechanical mixing apparatus can be eliminated, capital and maintenance costs can be reduced. Seeking this goal, the use of the electrostatic field to both mix and then separate the fluids is an intriguing advance in the art.

SUMMARY OF THE INVENTION

In accordance with the present invention, two or more fluids to be mixed are passed through an electrostatic field having a gradient high enough to force movement of drops of the more polar of the fluids fast enough to be sheared into smaller sizes which will be dispersed in the less polar of the fluids. Subsequently, the mixture of fluids is passed through a second electrostatic field of lesser intensity than the first electrostatic field having a gradient of the strength to force movement of the dispersed drops of polar fluids into coalescense.

More specifically, the process of alternately mixing and coalescing is most effective with liquids. In mixing liquids, one liquid being more polar than the remaining liquids, transfer of material from one liquid to the other will occur more efficiently if the electrostatic field is applied, to disperse the more polar of the fluids. Of course it is then necessary to separate the liquids and the electrostatic field is adjusted to a lesser gradient strength to bring about coalescense as preliminary to the final separation.

The implementation of the process with structure may be carried out in several different embodiments. Perhaps the more simple form of structure is that wherein the electrodes are positioned along the flow path of liquids close enough to generate a field strong enough to mix the liquids and then placing the electrodes far enough apart to provide that lesser field strength which coalesces the more polar of the liquids. Specifically, an electrode which has a serpentine cross-section can be placed along the flow path and matched with a second electrode of similar shape to bring the electrode surfaces alternately close together and farther apart. Uniformly charged, the electrodes would provide a field between them which is alternately strong and weak, or greater and smaller. The liquids flowing through this varying field will be alternately mixed and the more polar of the liquids coalesced.

The invention includes the concept of establishing a zone in which the serpentine electrodes receive two liquids from differing directions to be mixed and separated. More specifically, the serpentine electrodes are arranged for the liquid to flow vertically, one approaching the zone from above and the other approaching the zone from below. The alternate mixing and coalescing within the zone results in the more polar of the liquids flowing in one direction from the zone, its droplets coalescing and gravitating, while the less polar of the liquids leaves the zone by traveling in the opposite direction. Thus, the mixing occurs in the zones of the serpentine plates and separation of the two liquids from each other completes the process. More specifically, material contained in one of the liquids would be transferred to the other of the liquids in the mixing and coalescing zone, the separated liquids then emerge from the zone, the material having been exchanged between the two liquids during the mixing.

Under the concepts of the invention, the liquid streams of a liquid-liquid extraction system are interlocked at the dispersing-coalescing zone. The extraction is made in the zone and the liquid streams flow from the zone, separated for subsequent use in the system. The extraction system is further defined as a cyclic process for selectively recovering a metal from a material which contains other metal values in addition to the selected metal. An aqueous feed liquid is obtained by its taking up the material including the selected metal. This aqueous feed liquid is mixed with a lean organic liquid to which is transferred the selected metallic value. This mixing is carried out with the force of an electrostatic field which is intense enough to cause the drops of the aqueous phase to shear into droplets of small size and disperse through the organic liquid which is capable of extracting the selected metal from the aqueous feed liquid.

After the mixing, the fluid mixture, comprising the aqueous phase dispersed in the organic liquid, is separated into its phases. The separation is initiated by passing the mixture through an electrostatic field intense enough to move the droplets of the aqueous phase into coalescense but less intense than the first electrostatic field.

Considering both fields together, the field first mixes the phases and then coalesces the more polar of the phases to the end that the coalesced phase separates by gravity from the other liquids. The electrodes are located so the flow of the mixture through their zone is distributed uniformly relative to the electrodes. A potential is applied to the electrodes to produce an electrostatic field through which the mixture passes.

The process of the invention can be applied to the selective solvent extraction of various metals, such as nickel, molybdenum, uranium, and copper from materials containing them. Aqueous feed liquids are used to take up the selected metal values, together with other metal values, from such materials. The resulting, pregnant feed liquid, containing dissolved metal values, is intimately contacted. E.g., mixed with an organic medium carrying an exchange reagent, which has a high affinity for the selected metal and a low affinity for other contaminating metals contained in the pregnant feed liquid.

Such reagents as substituted benzophenone oxime, sold by General Mills under the trade mark LIX 64N and LIX 65N are effective in selectively extracting copper values from acid sulfate and ammoniacal solutions. These reagents form chelates with the copper values and are generally known as chelating reagents. Molybdenum, uranium and cobalt can be selectively extracted from acidic aqueous solutions using amine reagents such as those sold by Ashland Chemical Company under the trade mark adogen amines. Acidic reagents, such as DI-(2-ethlhexyl) phosporic acid are effective in selectively extracting zinc and vanadium from acidic aqueous solutions. The metal values in the pregnant feed liquid are exchanged for a cation or anion of the exchange reagent to form a complex which is not soluble in the aqueous phase but is soluble in the organic phase, thereby producing a mixture comprising an aqueous phase containing exchanged cations or anions and an organic phase containing the exchange reagent and the metal complex thereof.

Organic solvents containing oxygen bonded to carbon, such as esters, ethers, alcohols, and ketones, and those containing oxygen bonded to phosphorus in alkylphosphoric esters, such as tributylphosphate, are capable of selectively extracting metals or metal complexes from aqueous solutions. These reagents are known as neutral or solvating reagents, and the selected metal values in the aqueous phase are dissolved into the organic phase, thereby providing a mixture of the organic phase containing the selected metal and the aqueous phase which is depleted of the selected metal values.

Common to all systems, a mixture is formed comprising an aqueous phase from which the selected metal values have been extracted and an organic phase containing the extracted metal values. This mixture is formed in a zone with an electrostatic field of sufficient intensity to disperse the more polar of the phases. Subsequently, the electric field is adjusted in intensity to bring about coalescense of the dispersed phase. The coalesced aqueous phase is then separated by gravity from the organic phase which now contains a metal-bearing, organic exchange reagent. The aqueous phase may be recycled as feed liquid for further removal of metallic values from the metal-bearing materials.

This organic phase containing the metal-bearing, exchange reagent is flowed to a stripping stage, wherein it is mixed with an aqueous stripping solution containing exchange ions which are capable of replacing the selected metal and regenerating the exchange reagent. The mixture produced during the stripping comprises an aqueous portion containing exchanged ions of the selected metal and an organic portion containing the regenerated exchange reagent. Again, the mixing is brought about by an electrostatic field. And, subsequently, an electrostatic field is used to coalesce the more polar of the fluids. After gravity settling, the coalesced, aqueous, metal-bearing phase is separated from the organic phase which contains the exchange reagent. The organic phase is recycled as the reagent used to extract metal ions from the pregnant, aqueous, feed liquid. The enriched, aqueous solution containing the selected metal is an essentially impurity-free solution which can be further treated to recover the metal therefrom in essentially pure form.

The mixing, coalescing and separation steps of the process are advantageously accomplished using electrostatic fields of the proper intensity. The apparatus is relatively simple, especially in view of the elaborate and complex equipment presently used in the oil industry for separating small quantities of water from oil, kerosene, and other gasoline fractions. The process and apparatus of this invention provides a substantial decrease in the time for mixing and coalescense of the dispersed aqueous phases of the aqueous-organic dispersions which contain substantial amounts of water. As a result, the rate of phase separation is markedly increased, and the amount of mixture which can be separated is increased by a factor of 5 or more.

Other objects, advantages and features of the invention will become apparent to one skilled in the art upon consideration of the written specifications, appended claims and accompanying drawings.

DETAILED DESCRIPTION OF ILLUSTRATED EMBODIMENT

DE-SALTING CRUDE OIL VS. LIQUID-LIQUID EXCHANGE

The invention can be visualized in a generalized system in which the process of mixing two or more fluids and then separating them is completed. When the mixing and separation is carried out with the force of electrostatic fields, or a field of varying intensity, the concept is novel. However, a practical, down-to-earth application is needed to put dramatic teeth into the embodiment.

It presently appears that de-salting crude oil is the immediate problem which holds the most commercial promise. To reduce the salt content of produced crude oil, water is used to take up the salt. The water dissolves the salt. The water, and its salt, is then separated from the oil. This process, therefore, requires thorough mixing of the salted oil and water to transfer the salt. Then the water and oil must be separated so the oil of reduced water content can be sent on its way for refinement. The invention has very practical and commercially productive use in this mixing/separation problem.

There are other fluids which can be mixed and separated by the invention. The mixed liquids of a liquid-liquid solvent extraction system are a good prospect for use of the invention. The phases of an aqueous-organic are mixed. The mixture is then resolved. It is well-developed in the art how an electrostatic field can help resolve this liquid mixture into its phases. However, it is unique to carry out a liquid mixing function with an electrostatic field. It is also unique to employ an electrostatic field, or fields, to mix, and then separate, the liquids of the solvent extraction system which is used to recover metals from their ore.

Based on its immediate commerical potential, the de-salting system for crude oil edges out the liquid-liquid metal recovery system as the preferred embodiment. Before disclosing the invention in the de-salting system, certain fundamentals of this system should be understood.

REFLECTIONS ON FUNDAMENTALS

Figure 1:
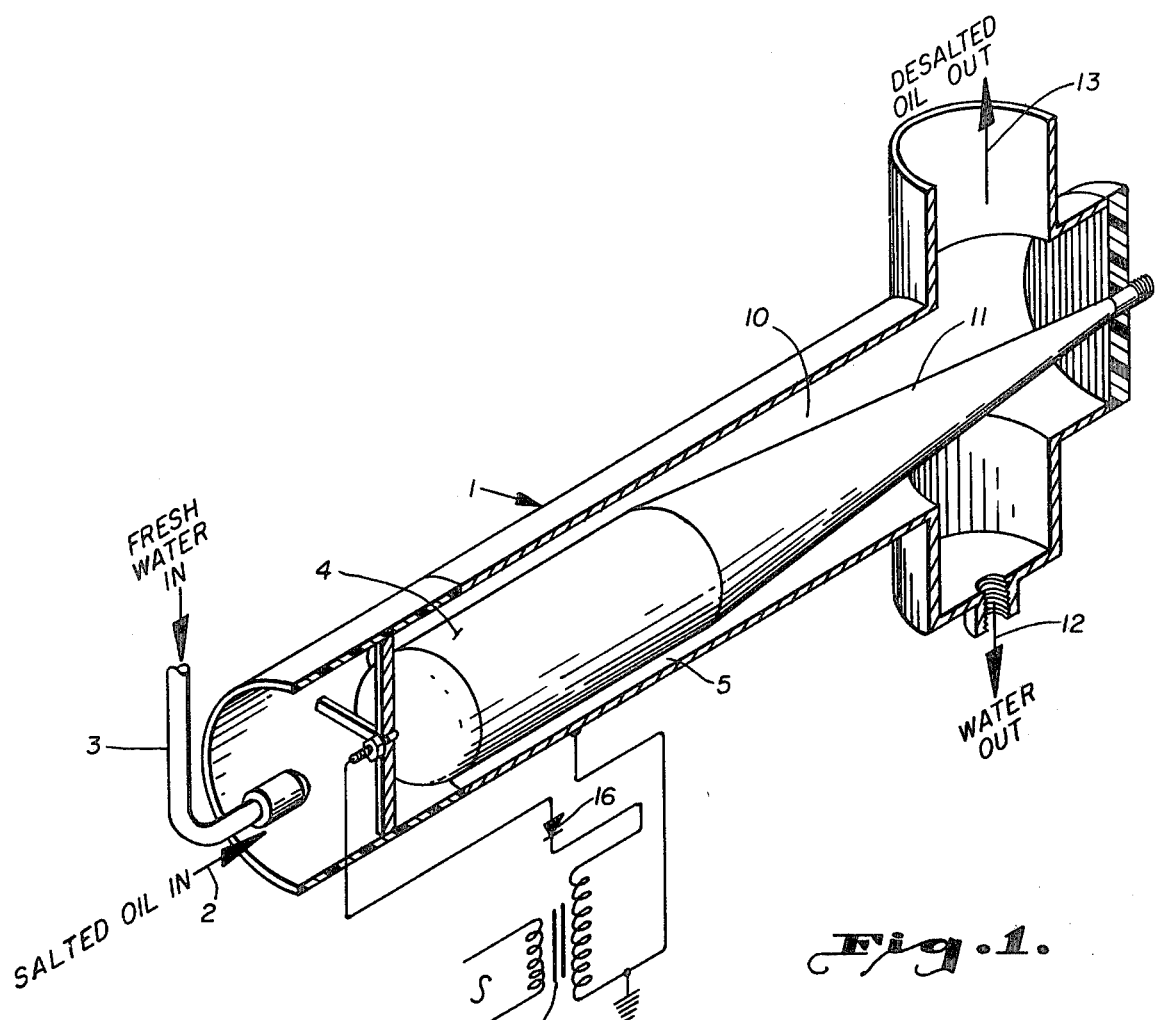
FIG. 1 is a sectioned isometric of a conduit-vessel and an energized electrode mounted therein embodying the present invention.

FIG. 1 of the drawings discloses relatively fresh water and crude oil flowed in a common flow path. The two liquids must be mixed. The oil is more viscous than the water.

Next, look at the two liquids from their electrical properties. The water is more conductive than the oil. The water is polar, certainly more polar than the oil.

As two different liquids, the water is to be dispersed in the oil in the form of drops. The oil is described as the continuous phase while the water is the phase dispersed in the oil. Movement, or transport, of the drops of water in the oil will be considered. When a liquid (water in the present case) is dispersed in a non-conductive, continuous phase liquid (oil in this case) and subjected to an electrical field, polarization and transport of the dispersed material is effected. If the field is alternating, reversals of polarization and direction of transport tend to eliminate translational effects on the dispersed phase while direct fields produce extended motion of this phase.

Movement of the dispersed phase is opposed by viscous drag forces within the continuous oil phase. These opposing forces cause distortion of the dispersed drops with the result that the drops are broken up if the distortion is sufficient to produce large excess surface free energy.

It may be visualized that an equilibrium drop size distribution is associated with a given field strength such that larger drops will be reduced by the shear forces associated with the induced motion and smaller drops will be coalesced by motion-induced collisions. The use of a gradually reduced field strength to cause appreciation of drop size is the basis of shaped field coalescense while conversely the use of increasing field strength to reduce the mean size of the drop distribution is the basis of electrostatic mixing.

The advantages of electrostatic mixing are as follows: (A) the production of small mean drop sizes at minimum power input; (B) the application of translational energy directly to the phase boundary area to minimize boundary layer stagnation of the continuous phase which normally limits mass transfer between phases; (C) the oscillatory effect of the field on the dispersed phase which provides internal mixing and subsequent promotion of mass transfer inside of the dispersed drops; (D) the ease with which mixing intensity can be controlled by variations of field strength for critical situations; and (E) the reduction of necessary continuous phase shear on systems utilizing shear-sensitive materials such as polyelectrolytes.

Limitations on electrostatic mixing are those factors producing sufficient conductivity to result in loss of field strength. Therefore, the method is limited to non-conductive continuous phase systems with the quantity of conductive dispersed phase maintained below a level at which appreciable drop-to-drop chain conduction occurs. It is also likely that in most cases the discontinuous phase must be loosely dispersed prior to electrostatic mixing in order to prevent localized zones of high conductivity.

THE DE-SALTING SYSTEM

To be specific, salt is not usually bound directly to the oil bodies. The salt is actually dissolved in water which is dispersed throughout the oil bodies. The problem is that of mixing fresh water with the oil, and its salt water, so that the fresh water effectively contacts the water which actually contains the salt. In final effect, the salt-loaded water is diluted by its contact with the fresh water and re-distribution of the salt in the combined water.

This concern with the specific mechanism of salt retention and dilution may appear to be a non-sequitur. However, it is significant when the mixing problem is fully stated. It is necessary to shear the fresh water to drop sizes which will effectively contact the salt-loaded water drops dispersed throughout the oil. To get at the salt, the fresh water must come in contact with the salt-bearing water. Then the water droplets, with their salt, must be coalesced.

This cycle of shearing fresh water drops, contacting the salt-bearing water drops with the fresh water drops, and coalescing the combined drops, has the sound of completeness. As a practical matter, one such cycle does not result in full contact between salt and fresh water, the cycle of shearing, contacting and coalescing must be repeated more than once to shift desired amounts of salt out of the oil. At least there are enough oils which have the salt content that requires repetition of the cycle to make it advisable to disclose more than one stage of shearing, coalescing and separation.

If the basic mechanics of the system are understood, the disclosure is simple and can be readily followed. The salt is in the water dispersed in the oil. Fresh water is sheared into drop sizes which can then effectively contact the salt water drops. The resulting drops are coalesced and separated. If enough salt remains in water which was not caught up in the coalescing, separating action, the cycle may have to be repeated.

FIG. 1

Having properly conditioned the disclosure with fundamentals and placing the crude oil de-salting system in proper perspective, the simple, single-stage, mixing-coalescing-separation process and structure in which the process can be carried out can be understood.

In FIG. 1, structure 1 is in the form of a metallic conduit-vessel. Crude oil is fed into the vessel 1 from the left end 2 of the vessel. The crude oil is loaded with salt, and this salt content must be reduced. Relatively fresh water is introduced, by conduit 3, to dissolve the salt.

The crude oil and fresh water must be thoroughly mixed to transfer the salt to the fresh water. Metallic cylinder 4 is spaced from the internal surface of vessel-conduit 1 and both structures are electrically energized as electrodes. An electrostatic field is generated in space 5 between the electrodes which is also the flow path for the crude oil and water to be mixed. The field is established at the intensity which will cause the fresh water drops to be sheared into sizes small enough to be dispersed throughout the oil and contact the water already in the oil in which salt is dissolved. The combination of the salt water and fresh water reduces the salt content of the water originally in the oil. Then, when the combined water is coalesced and separated from the oil, salt is removed from the oil.

In annulus 5 the electrostatic field is intense enough to move the fresh water drops fast enough through the oil to shear the water drops to the size in accordance with the intensity of the field. For the first time, an electrostatic field has been deliberately generated and given the magnitude which will systematically shear polar liquid drops and, in effect, mix liquids which have a polar differential. The present structure not only carries out this process of mixing, but additionally begins the separating process by applying an electrostatic field to coalesce the dispersed polar liquid drops.

The reasons for mixing the fluids have been extensively disclosed supra. The specific reason, in FIG. 1, has been explained. That much is behind us. Ultimately, the water and oil must be separated to further process the oil.

Downstream of flow path 5, connected to flow path 5, is an expanding annular space 10. The space, or volume, expands in the direction of flow because electrode portion 11 decreases in diameter in the direction of flow. In effect, the internal walls of vessel-conduit 1 diverge from the external walls of electrode portion 11. The arrangement, described to carry out the process of mixing and coalescing, should be readily understandable from a simple inspection of the drawing.

The remainder of the FIG. 1 disclosure shows the removal of separated oil and separated water. The water is coalesced in the flow path 10 and the enlarged drops gravitate downward to flow from conduit-vessel 1 out conduit 12. The oil rises and flows out conduit 13. Of course, more elaborate collection structure and controls of conduits 12 and 13 could be shown, but not to advantage in disclosing the invention. These are details better left to common practices of the art. The mixing and coalescence has been carried out. The remaining fluid handling problem is met by prior art practice.

In conclusion, relative to FIG. 1, the shell of conduit 1 and electrode 4, 11, as electrodes, are connected to an electrical source 14 through a transformer 15. Specifically, the secondary of transformer 15 is connected by one end to conduit-vessel 1 and by the second end to electrode 4,11. Diode 16 is included in the circuit to establish a d.c. potential between the electrodes. Although an a.c. potential would work, the d.c. potential appears to give better results, more transport, or movement, to the polar drops to shear them to the desired size.

At this point in the disclosure, it seems fair to state that at least some part of the inventive concept is embodied in structure which establishes either two fields in a fluid flow path of different intensities or a single field of two different intensities. The higher of the two fields is intense enough to mix two or more fluids and the second field is intense enough to begin the separation of mixed fluids. This analysis applies to FIG. 1 and it also applies to FIGS. 2, 3 and 4. The difference between the FIGS. is in the structural arrangement with which to generate the two different field intensities.

FIGS. 2–4

Figure 2:
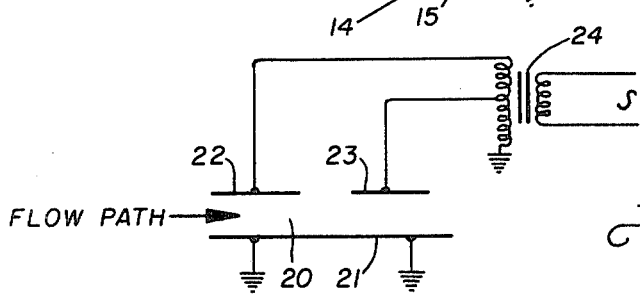
FIGS. 2–4 are schemmatic arrangements of energized electrodes and flow paths in which fluids are mixed and coalesced.

All of FIGS. 1–4 have a flow path for the fluids. In FIG. 1, the flow path is 5, 10. In FIG. 2, the flow path is 20. Electrodes are on each side of flow paths of FIGS. 1–4. In FIG. 1 the electrodes are the inner wall of conduit-vessel 1 and the outer walls of electrode portions 4 and 11. In FIG. 2, electrode 21 is on one side of path 20 and electrodes 22 and 23 are on the other side. In FIG. 2, the electrodes are energized at different levels to generate this field intensity differential. This differential is provided by connecting electrode 22 to the end of the secondary of transformer 24 while electrode 23 is connected to the secondary at an intermediate position.

In the arrangement disclosed and described in FIG. 2, a first electrostatic field of relatively high intensity is established between electrode 22 and electrode 21. Mixing of two or more fluids occurs in this field. Downstream, in flow path 20, an electrostatic field is established between electrode 23 and electrode 21. The intensity of this field is established at the level to coalesce the more polar of the fluids mixed in the first field. Thus, as in FIG. 1, the structure of FIG. 2 carries out the mixing and coalescing under the concepts of the invention.

Figure 3:
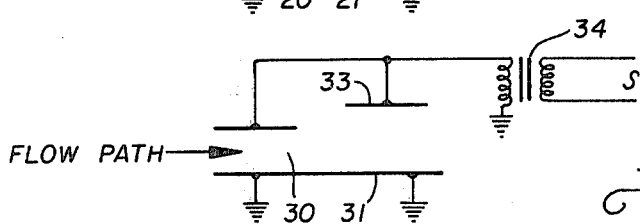

FIG. 3 serves to disclose the principal of varying the intensity of the electrostatic fields by the spacing of the electrodes. A flow path 30 has electrode 31 on one side and electrodes 32 and 33 on the other side. Electrodes 32 and 33 are connected in parallel to the secondary of transformer 34. As is apparent from an inspection of FIG. 3, electrode 32 is located a shorter distance from electrode 31 than electrode 33. Energized at the same potential level, electrode 32 will generate an electrostatic field of greater intensity than that generated by electrode 33. Again, mixing will take place in flow path 30 between electrodes 31 and 32 and coalescing will take place between electrodes 31 and 33.

Figure 4:
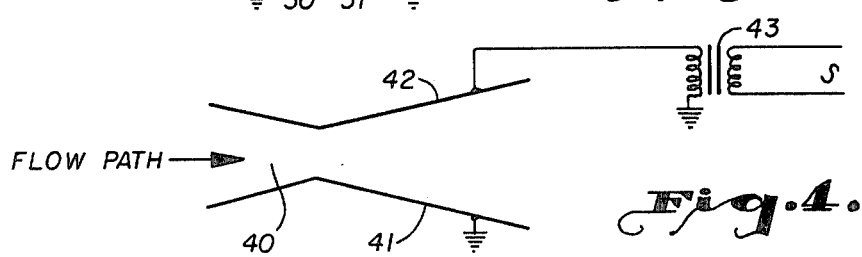

In FIG. 4, a flow path 40 is established between electrodes 41 and 42. Electrode 42 is connected to the secondary of transformer 43. In the direction of the flow, these electrodes converge toward each other and then diverge from each other. Here we have what may be termed a single electrostatic field with varying intensity along the flow path 40. As the electrodes converge, the intensity of the field increases, and as the electrodes diverge the intensity of the field decreases. With this configuration of electrodes, the intensity of the field will increase to the point in the flow path where the electrodes approach each other most closely. Mixing of fluids will take place up to that point and coalescing of the more polar of the fluids will take place downstream of that point.

FIG. 5

Figure 5:
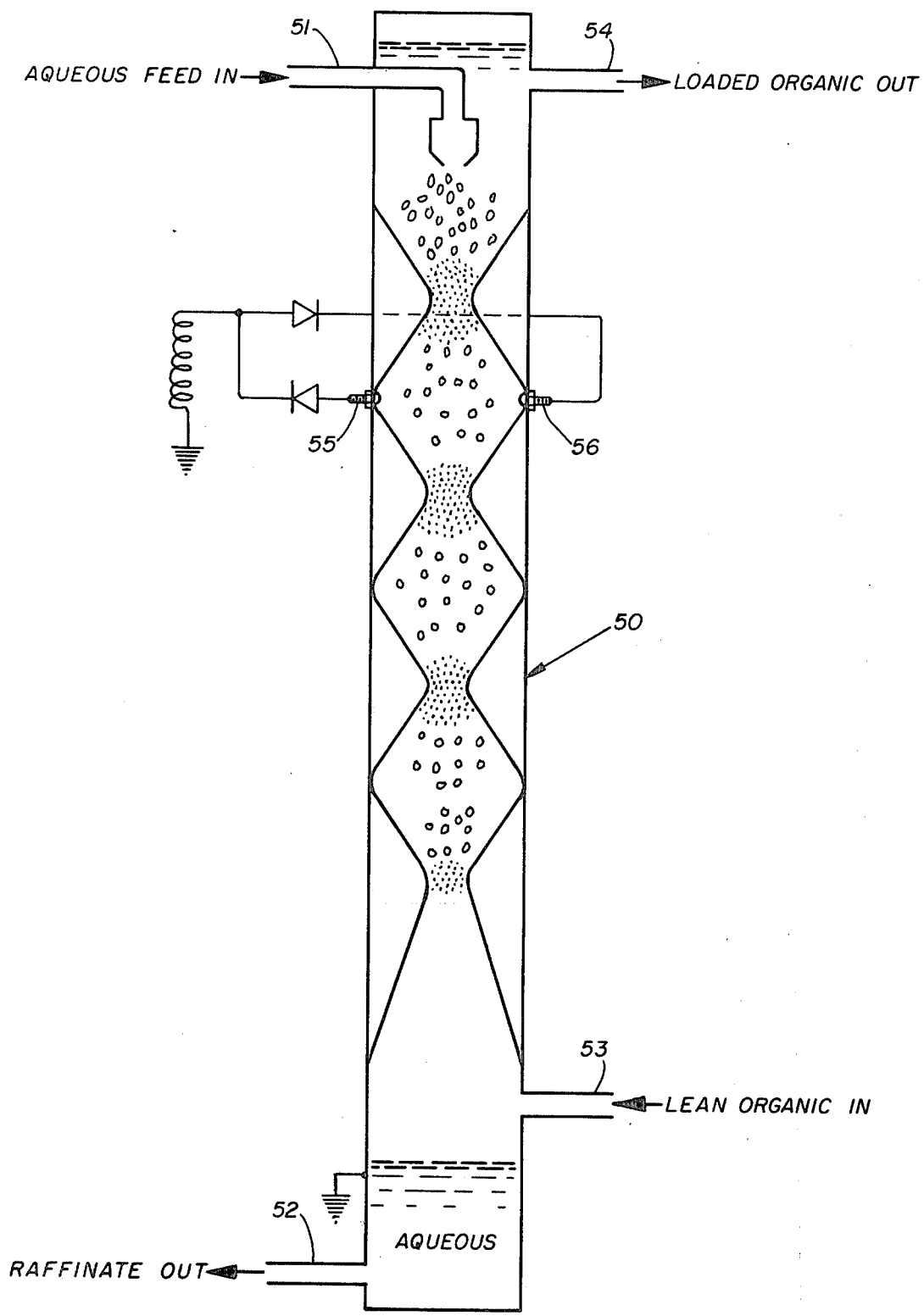
FIG. 5 is a sectioned elevation of a column in which electrodes provide a series of mixing and coalescing stages for fluids.

FIG. 5 embodies the invention in the structure with which the aqueous and organic liquids of a solvent extraction system are mixed and separated. As previously reviewed in detail, metallic values are exchanged between the two liquids when they are mixed. More specifically, the system is designed to transfer the metallic values from the aqueous stream to the organic stream. This transfer is part of the procedure with which metal is recovered from its ore.

There are several interlocked liquid cycles in a complete solvent extraction system. Only two of these loops are interlocked for mixing and separation in FIG. 5. The invention provides an electrode configuration which generates an electrostatic field of varying intensity to first mix the two liquids and then separate them.

In a sense, the above statement is somewhat incomplete, the two liquids are flowed counter-current to each other through the electrostatic field which is varied in intensity along the common flow path for the liquids to mix and coalesce in a series of "stages".

Turning to the structure more specifically, a vertical column, or vessel, 50 is illustrated in cross section. Conduit 51 at the upper end of the column receives a stream of aqueous feed liquid loaded with metallic values. This liquid flows down in the column. Stripped of its metallic values the liquid exits the column near its bottom through conduit 52. Then lean feed liquid, commonly termed raffinate, is returned to take up more metallic values.

Lean organic liquid enters the column 50 near its lower end by way of conduit 53. This liquid is directed to flow upward in column 50 and leaves column 50 by conduit 54, having received the metallic values it has selctively removed from the feed liquid. Between the upper part of the column and the lower part of the column 50, the two liquids are mixed by an intense electrostatic field and the more polar aqueous liquid is coalesced by a less intense electrostatic field. This sequence of mixing and coalescing is repeated a number of times to satisfactorily shear the aqueous liquid into drops small enough for their effective contact with the organic liquid to complete the exchange.

From this point, mere inspection of the configuration of electrode 55 and electrode 56 makes it clear that the serpentine shapes of the electrodes will arrange their surfaces alternatively close to each other and then farther apart to create the varying intensity of the field which mixes and then coalesces.

From the foregoing, it will be seen that this invention is one well adapted to attain all of the ends and objects hereinabove set forth, together with other advantages which are obvious and inherent to the method.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A process for first mixing and then separating two fluids which are immiscible and wherein one fluid is more polar than the other fluid, including,
    passing both fluids into a first common zone,
    generating an electrostatic field of a first intensity in the first common zone at which intensity drops of the more polar of the two fluids will be moved by the field force fast enough to shear into smaller sizes of drops and distribute throughout the less polar of the fluids,
    maintaining the fluids in the first common zone for a first predetermined residence time,
    flowing the mixture of fluids from the first common zone to a second common zone,
    generating an electrostatic field of a second intensity less than the first intensity in the second common zone to provide a force on the droplets of the more polar of the two fluids to move the droplets into collision with each other and coalesce into drops of larger size,
    maintaining the fluids in the second common zone for a second predetermined residence time,
    passing the fluids from the second common zone and providing a third residence time to enable the coalesced drops of the more polar fluid to gravitate from the remaining fluid and separate,
    and separately flowing the fluids after they have gravitated from each other.
2. The process of claim 1 in which,
    the immiscible fluids are water and oil and salt is removed from the oil into the water when the oil and water are mixed in the first common zone.
3. The process of claim 1, in which,
    the fluids are an aqueous solution in which metallic values are contained and an organic solution having a high affinity for a selected metallic value of the metallic values contained in the aqueous solution and the exchange of the selected metallic values take place when the fluids are mixed in the first common zone.

4. The process of claim 1 in which,
the fluids are passed into the first common zone from opposite directions, the fluids flowing from the zone in opposite directions after having been mixed and then separated.

5. The process of claim 4 in which,
the fluids are passed in counter-current flow through a series of zones, the fluids flowing vertically to mix with each other and then separate from each other a plurality of times, the more polar and heavier of the fluids gravitating downward and the less polar and less heavier of the fluids flowing upward.

6. A process for first mixing and then separating two fluids which are immiscible and wherein one fluid is more polar than the other fluid, including, passing both fluids into a common zone for a predetermined residence time, generating an electrostatic field of a first intensity in the common zone at which intensity drops of the more polar of the two fluids will be moved by the field force fast enough to shear into smaller sizes of drops and distribute throughout the less polar of the fluids during the first predetermined residence time, generating an electrostatic field of a second intensity less than the first intensity in the common zone to provide a force on the droplets of the more polar of the two fluids to move the droplets into collision with each other and coalesce into drops of larger size during a second predetermined residence time, and separately flowing the fluids after they have gravitated from each other.

* * * * *